United States Patent
Aksoy et al.

(10) Patent No.: US 10,037,615 B2
(45) Date of Patent: Jul. 31, 2018

(54) SYSTEM AND METHOD FACILITATING PALETTE-BASED COLOR EDITING

(71) Applicants: DISNEY ENTERPRISES, INC., Burbank, CA (US); ETH Zürich, Zürich (CH)

(72) Inventors: Yagiz Aksoy, Zurich (CH); Tunc Ozan Aydin, Zurich (CH); Marc Pollefeys, Zurich (CH); Aljosa Smolic, Zurich (CH)

(73) Assignees: Disney Enterprises, Inc., Burbank, CA (US); ETH ZURICH, Zurich (CH)

( * ) Notice: Subject to any disclaimer, the term of this patent is extended or adjusted under 35 U.S.C. 154(b) by 73 days.

(21) Appl. No.: 15/201,376

(22) Filed: Jul. 1, 2016

(65) Prior Publication Data

US 2018/0005409 A1    Jan. 4, 2018

(51) Int. Cl.
*G06T 11/00*   (2006.01)
*G06T 7/40*    (2017.01)

(52) U.S. Cl.
CPC ............ *G06T 11/001* (2013.01); *G06T 7/408* (2013.01)

(58) Field of Classification Search
CPC .......... G09G 5/02; G09G 5/06; G06T 11/001
See application file for complete search history.

(56) References Cited

U.S. PATENT DOCUMENTS

| | | | |
|---|---|---|---|
| 6,512,850 B2 * | 1/2003 | Yaung | G06F 17/30256 382/195 |
| 7,486,300 B2 * | 2/2009 | Rose | G09G 5/02 345/593 |
| 7,586,300 B2 | 9/2009 | Miller | |
| 2002/0080153 A1 * | 6/2002 | Zhao | H04N 1/644 715/700 |
| 2009/0027414 A1 * | 1/2009 | Vaughn | G09G 5/02 345/603 |

* cited by examiner

*Primary Examiner* — Antonio A Caschera
(74) *Attorney, Agent, or Firm* — Sheppard Mullin Richter & Hampton LLP (57) ABSTRACT

This disclosure related to systems and methods of palette-based color editing. A set of principle colors may be identified from among individual colors of individual pixels of an image. Color distributions about the individual principle colors may be determined. An individual color distribution may include a homogenous range of colors that may vary with respect to an individual principle color. Pixels may be associated with one or more pixel groups based on correspondences between individual colors of the individual pixels and individual colors included in the individual color distributions corresponding to the individual pixel groups. Color editing may be effectuated by modifying colors of pixels in a given group independently from other colors of other pixels in other groups.

16 Claims, 7 Drawing Sheets
(4 of 7 Drawing Sheet(s) Filed in Color)

SYSTEM AND METHOD FACILITATING PALETTE-BASED COLOR EDITING

FIELD OF THE DISCLOSURE

This disclosure relates to palette-based image editing.

BACKGROUND

Color editing is a technique of image editing. Example-based color editing methods allow the user to transfer colors from a reference image. Scribble-based methods propagate local edits to similar neighboring pixels of an input image. Palette-based color editing offers an alternative workflow that starts by extracting a color palette from the input image. The user can edit palette colors thereby changing the colors of the input image according to the edited palette. A color palette comprises of a set of palette entries. Individual palette entries may represent individual colors of in an image. By way of non-limiting illustration, palette-based color editing typically includes color palettes of 5-7 prominent colors of the corresponding images. Individual palette entries are then represented by a solid color. Palette-based color editing is especially suitable for casual users who do not possess the skills to use sophisticated tools but still aim at performing expressive edits.

SUMMARY

One aspect of the disclosure relates to a system configured to facilitate palette-based color editing. Distinct from known palette-based editing techniques, individual palette entries of the present disclosure may represent homogeneous ranges of colors as opposed to solid colors. As such, individual palette entries may represent a wider spectrum of colors in an image than with conventional solid color entries. Color editing may be facilitated by grouping individual pixels into one or more pixel groups based on the color distributions of the palette entries.

In some implementations, the system may include one or more of non-transitory electronic storage, one or more physical processors configured by machine-readable instructions, and/or other components. Executing the machine-readable instructions may cause the one or more physical processors to facilitate palette-based color editing. The machine-readable instructions may include one or more of a palette entry component, a pixel group component, a color unmixing component, an interface component, an editing component, and/or other components.

Non-transitory electronic storage may be configured to store visual information of a first image and/or other images. The visual information may define individual colors of individual pixels of the first image and/or other images.

The palette entry component may be configured to identify a set of principle colors from among the individual colors of the individual pixels of the first image and/or other images.

The palette entry component may be configured to determine color distributions about individual principle colors. An individual color distribution may include colors that vary with respect to an individual principle color. By way of non-limiting illustration, responsive to identifying a first principle color of the first image, a first color distribution about the first principle color may be determined. The first color distribution may include a first set of colors that vary with respect to the first principle color. By way of non-limiting illustration, responsive to identifying a second principle color of the first image, a second color distribution about the second principle color may be determined. The second color distribution may include a second set of colors that vary with respect to the second principle color.

The pixel group component 110 may be configured to determine pixel groups. Pixel groups may be determined by associating individual pixels with one or more of the pixel groups. Individual pixel groups may correspond to individual color distributions. Individual pixels may be associated with one or more of the individual pixel groups based on correspondences between individual colors of the individual pixels and individual colors included in the individual color distributions corresponding to the individual pixel groups, and/or other information. By way of non-limiting illustration, pixel groups may include one or more of a first pixel group, a second pixel group, and/or other pixel groups. The first pixel group may correspond to the first color distribution, and/or other color distributions. A first pixel may be associated with the first pixel group based on a correspondence between a first color of the first pixel and a second color and/or other colors within the first set of colors included in the first color distribution and/or other color distributions. The second pixel group may correspond to the second color distribution and/or other color distributions. A second pixel may be associated with the second pixel group based on a correspondence between a third color of the second pixel and a fourth color and/or other colors within the second set of colors included in the second color distribution, and/or other color distributions.

The color unmixing component may be configured to determine color components of individual pixel colors. By way of non-limiting example, individual pixel colors may be decomposed into color components. Individual color components may comprise colors selected from individual ones of the color distributions of the palette entries.

The interface component may be configured to effectuate presentation of one or more user interfaces via one or more computing platforms associated with one or more users. A user interface may be configured to facilitate one or more features and/or functions of the system and/or provide visualization of one or more features and/or functions of the system.

The editing component may be configured to facilitate editing of images, and/or other operations. In some implementations, editing may comprise color editing and/or other types of editing. In some implementations, the color editing may comprise palette-based color editing, in accordance with one or more implementations of system herein.

By way of non-limiting example, color editing may include modify individual colors (and/or color components) of individual pixels of an image based on associations of individual pixels with one or more pixel groups. Individual colors (and/or color components) of individual pixels of individual pixel groups may be modified separately from other individual colors (and/or color components) of individual pixels of other individual pixel groups.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
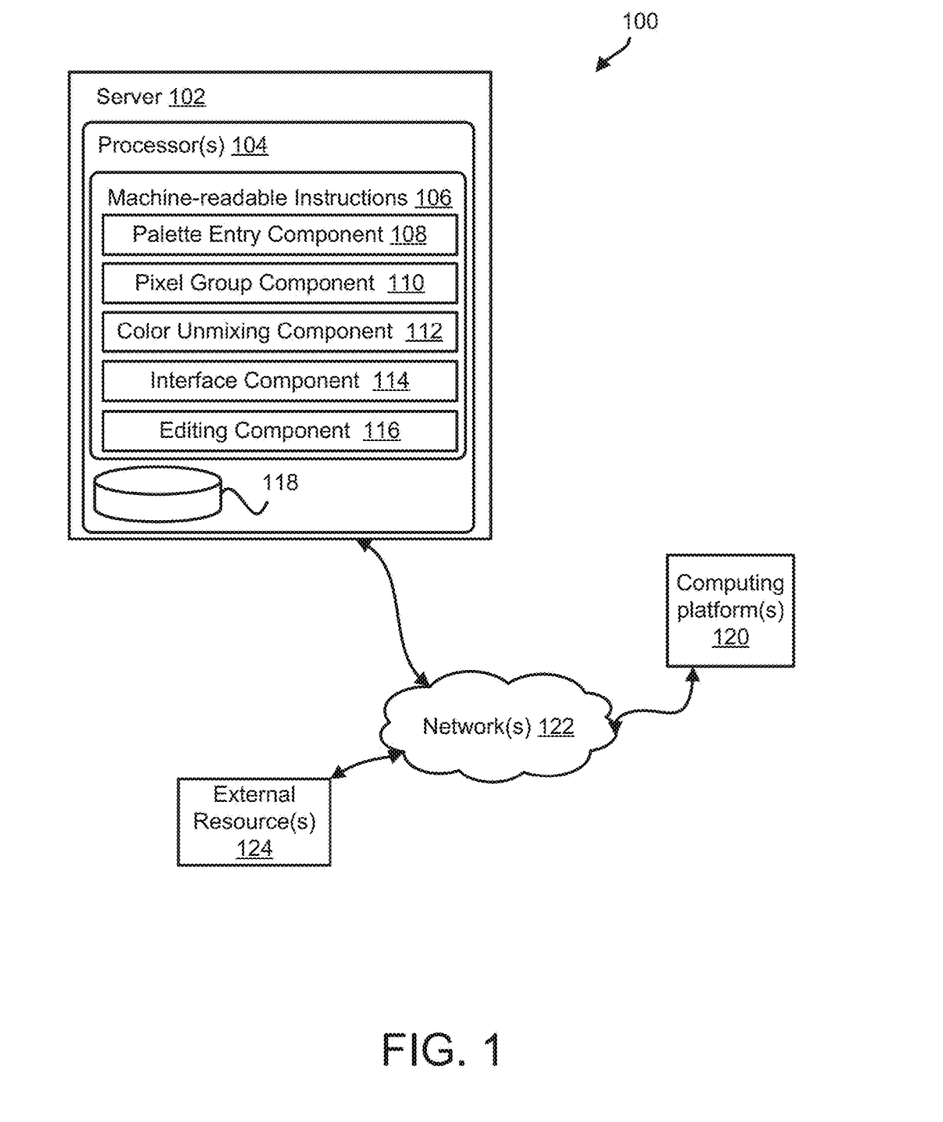
FIG. 1 illustrates a system configured to facilitate palette-based color editing, in accordance with one or more implementations.

FIG. 1 illustrates a system 100 configured to facilitate palette-based color editing. In particular, individual palette entries of a color palette of an image may correspond to individual homogeneous ranges of colors. This may provide for a more robust editing framework than conventional methods.

In some implementations, system 100 may comprise one or more of a server 102, one or more computing platforms 120, one or more external resources 124, and/or other components. The server 102 may include one or more of non-transitory electronic storage 118, one or more physical processors 104 configured by machine-readable instructions 106, and/or other components. Executing machine-readable instructions 106 may cause the one or more physical processors 104 to palette-based color editing. The machine-readable instructions 106 may include one or more of a palette entry component 108, a pixel group component 110, a color unmixing component 112, an interface component 114, an editing component 116, and/or other components.

In some implementations, server 102 may be configured to provide remote hosting of the features and/or functions of machine-readable instructions 106 to one or more computing platforms 120 that may be remotely located from server 102. In some implementations, one or more features and/or functions of server 102 may be attributed as local features and/or functions of one or more computing platforms 120, and/or other entities participating in system 100. By way of non-limiting example, individual ones of one or more computing platforms 120 may include one or more physical processor configured by machine-readable instructions comprising the same or similar components as machine-readable instructions 106 of server 102. One or more computing platforms 120 may be configured to locally execute the one or more components that may be the same or similar to machine-readable instructions 106.

Individual ones of one or more computing platforms 120 may include one or more of a cellular telephone, a smartphone, a digital camera, a laptop, a tablet computer, a desktop computer, a television set-top box, smart TV, a gaming console, and/or other platforms.

Non-transitory electronic storage 118 may be configured to store visual information defining images, and/or other information. Visual information may include pixel information for individual images, and/or other information. Pixel information may include one or more of position information, color information, and/or other information.

Position information may specify pixel coordinates of individual pixels of an image.

Color information may specify colors of individual pixels, and/or other information. In some implementations, colors may be specified by values of one or more color attributes, and/or other information. For example, individual colors may be represented within color space and/or other specifications. A color space may include one or more of an RGB color space, sRGB color space, a CMYK color space, and/or other color space representations. A color space may specify chromaticities of different colors (also referred to as "color channels") of the space, and/or other information. For example, an RGB color space may be defined by three chromaticities of red, green, and blue additive primaries. Individual color attributes may correspond to individual ones of the colors that make up a color space. Values of individual color attributes may specify the chromaticity of a color of the color space.

By way of non-limiting example, a single color may be specified by values of individual one of a first color attribute, a second color attitude, a third color attribute, and/or other color attributes. In an RGB color space, the first color attribute may correspond to the color red, the second color attribute may correspond to the color green, and/or the third color attribute may correspond to the color blue. The values of the color attributes may specify chromaticity of the respective colors, and/or other information.

In some implementations, non-transitory electronic storage 118 may be configured to store visual information based on one or more of user input directing storage of visual information to non-transitory electronic storage 118 (e.g., image uploads from one or more external devices to non-transitory electronic storage 118), non-transitory electronic storage 118 comprising an image database, and/or other techniques.

By way of non-limiting illustration, non-transitory electronic storage 118 may be configured to store visual information of a first image and/or other images. The visual information of the first image may define individual colors of individual pixels of the first image, and/or other information that may define the first image.

In some implementations, palette entry component 108 may be configured to determine palette entries of color palettes to facilitate palette-based color editing of images. In some implementations, individual palette entries may be represented by color distributions. A color distribution may comprise a homogeneous range of colors. Individual color distributions may be exclusive to the colors included in the color distributions. Generating palette entries that represent color distributions differs from current palette-based color editing techniques that instead generate individual palette entries that are represented by a single solid color. The quantity of palette entries that may be determined may be based on one or more of user input, how well individual pixels may be represented by one or more palette entries (see, e.g., discussion of "representation score" below), whether a current quantity of palette entries represents a majority of the colors of an image (see, e.g., discussion of "palette coverage"), and/or other information.

In some implementations, individual color distributions may be determined about individual principle colors. A given color distribution may be determined based on one or more of distribution parameters. Distribution parameters may include one or more of a principle color (also referred to as the "mean color" in the distribution), a covariance matrix, and/or other information. In some implementations, a color distribution may be visualized as a distribution about a hexagon and/or other shape. By way of non-limiting illustration, to visualize a color distribution, eigenvectors x1, x2, and/or x3 of a covariance matrix may be computed. A palette entry may be visually represented as a hexagon whose center (e.g., mean color) may comprise a principle color, and each vertex shows the principle color "shifted" in the direction of an eigenvector. A variance along the three eigenvectors in positive and negative directions may define colors of the six vertices. The colors of the vertices may be used for linearly interpolating colors that fill the hexagon. The colors that fill the hexagon may comprise the color distribution about the principle color.

In some implementations, distribution parameters for the individual color distributions about a principle color (e.g., one or more of the mean color, a variance, and/or other information) may be estimated by using a neighborhood operation and/or other techniques. By way of non-limiting example, a neighborhood operation may include an edge-aware neighborhood determined by a guided filter kernel around a pixel having a pixel color identified as a principle color, and/or other techniques. In some implementations, the "neighborhood" may comprise a 20 pixel radius, and/or other amount of pixels. For parameter estimation, individual samples of pixel colors in the neighborhood may be weighted by the corresponding guided filter kernel weight.

It is noted that the above description for determining color distributions is provided for illustrative purposes only and is not to be considered limiting. In some implementations, color distributions may be determined by other techniques. By way of non-limiting illustration, at least one other technique may include using expectation maximization with Gaussian Mixture Models, and/or other techniques.

In some implementations, palette entry component 108 may be configured to identify a set of principle colors from among individual colors of individual pixels of an image. In some implementations, individual principle colors may include one or more colors identified based on user input (see, e.g., interface component 116), and/or other techniques. Briefly, a user may select a color (e.g., a pixel) from an image via a user interface that presents the image. The user selection may prompt an identification of the selected color as a principle color. A color distribution about the selected color may be determined.

In some implementations, individual principle colors may be identified automatically and/or by other techniques. By way of non-limiting example, individual principle colors may be identified based on determining sizes of individual regions of an image that commonly share one or more colors, and/or other information. In some implementations, individual principle colors may be identified from the individual colors of individual regions of an image that may be relatively larger than other ones of the regions if the image.

In some implementations, individual principle colors may be identified by a voting scheme and/or other techniques. The voting scheme may take into account various information about an image including one or more of colors of individual pixels, currently determined palette entries, and/or other information. For example, a voting scheme may determine which pixel colors may be identified as principle colors based on one or more of sizes of individual regions of an image that commonly share one or more colors, whether individual pixel colors may already be represented by another color distribution (e.g., if such information is available, for example, from prior user selection of principle colors used to determine color distributions and/or one or more other automatically determined color distributions), pixels that may be located at sharp edges within an image (e.g., locations of drastic color change), and/or other information.

In some implementations, automatically identifying principle colors in the image may be based on color bins, and/or other techniques. Color bins may be created by dividing color channels (e.g., red, green, and blue color channels for an RGB space representation of individual colors) into equal non-overlapping portions. The color bins may comprise, for example, 10×10×10 color bins, and/or other size color bins. Individual pixels may be associated with a single bin that may span its color. A bin that determines a principle color may be selected using a voting scheme. In the voting scheme, individual pixel colors may start with full voting power for the bin the pixels belong. The voting power may be adjusted based on one or more cues. The cues may include that: pixel colors that may already be well-represented by an existing palette entry may get little voting power in order to promote the colors in the image that are not yet present in the palette, colors covering relatively large image regions may provide substantial votes, pixels at sharp edges may have little voting power because it is highly likely that they are mixtures of two palette entries, and/or other cues. By way of non-limiting illustration, the voting power, $v_p$, of a pixel, p, may be represented as:

$$v_p = e^{-\|\nabla I_p\|}(1-r_p),$$

where $\|\nabla I_p\|$ may represent a magnitude of an image gradient at a pixel, and $r_p$ may be a representation score, discussed herein. The bin with the most votes may identify a pixel's color as a principle color. After identifying a given principle color, and generating a correspond color distribution, the representation scores may be updated and the process repeated to determine a next principle color and color distribution to define another palette entry. Additional palette entries may no longer be generated based on a threshold percentage of the colors of the image being sufficiently represented by the current palette entries of the color palette.

In some implementations, it may be desired to determine subsequent principle color(s) from as many sample pixel colors as possible. A principal color may be a pixel color that has a high number of bin members nearby. This criteria may be expressed as:

$$\text{Next Priniciple Color} = \text{argmin}\{S_p e^{-\|\nabla I_p\|}\},$$

where $S_p$ may represent a ratio of the pixels belonging to a selected bin in current pixel p's neighborhood (which, as mentioned earlier, may be defined as a guided filter kernel with radius 20 pixels and/or other quantity of pixels).

It is noted that the above voting scheme technique for determining principle colors is provided for illustrative purposes only and is not to be considered liming. For example, in other implementations, other techniques for determining principle color from which color distributions and ultimately palette entries may be determined may also be employed. By way of non-limiting illustration, other techniques may include one or more of k-means clustering, k-medoids clustering in color space, and/or other techniques.

In some implementations, palette entry component 108 may be configured to determine per-pixel representation scores, and/or other information. A representation score may convey how well one or more currently determined palette entries of a color palette (possibly being incomplete until additional palette entries may be determined) represent a given color of a given pixel. By way of non-limiting example, given that individual palette entries may correspond to color distributions and not a single solid color, representation scores may be determined based on one or more measures that assesses how well a pixel's color may be represented by a color within a color distribution of a single palette entry and/or a combination of palette entries. In some implementations, individual pixel colors may be represented by a mixture of palette entries (see, e.g., color unmixing component 112).

In some implementations, for a single pixel, p, a representation score of the best fitting single palette entry (whose corresponding color distribution may be represented by "k") may be computed by:

$$s_p = \max_k \{e^{-D_k(c_p)}\},$$

$$k \in (1 \ldots K),$$

where $c_p$ represents the color of pixel, p; and $D_k$ represents the Mahalanobis distance between the $k^{th}$ color distribution and the pixel color.

In some implementations where an individual pixel color may be represented by a pair of color distributions, k and l, of a pair of respective palette entries, a representation score of the mixture that best represents the individual pixel color may be computed by:

$$d_p = \max_{k,l} \{e^{-\tilde{F}_{k,l}(c_p)}\}$$

$$k, l \in \{1 \ldots K\},$$

$$k \neq l,$$

where $\tilde{F}_{k,l}$ is a projected color unmixing cost computed by color unmixing component 112. A final representation score, $r_p$, may be determined by:

$$r_p = \max\{s_p, d_p\}.$$

It is noted that the above description of a representation score used to convey how well one or more currently determined palette entries of a color palette may represent a given color of a given pixel is provided for illustrative purposes only and is not to be considered limiting. For example, in other implementations, other techniques for determining how well one or more currently determined palette entries of a color palette may represent a given color of a given pixel may be implemented.

In some implementations, palette entry component 108 may be configured to determine palette coverage of current palette entries of a palette. Palette coverage may convey a measure that aggregates per-pixel representation scores into a global measure for an image. By way of non-limiting illustration, palette coverage may be determined by a ratio of "fully" represented pixel colors to the total quantity of image pixels. In some implementations, a "fully" represented pixel color may be correspond to an $r_p > 0.9$, and/or other measure. In some implementation, palette entry component 108 may be configured to stop determining addition palette entries in response to the palette coverage meeting or exceeding a threshold. In some implementations, the threshold may comprise 95% palette coverage (e.g., 95% of the image pixels are "fully" represented by a single palette entry and/or combination of palette entries), and/or other thresholds.

It is noted that the above description of determining palette coverage as a global measure of pixel color representation is provided for illustrative purposes only and is not to be considered limiting. For example, in other implementations, other techniques may be implemented.

By way of non-limiting illustration, palette entry component 108 may be configured to identify a set of principle colors from among the individual colors of the individual pixels of the first image and/or other images. The set of principle colors may include one or more of a first principle color, a second principle color, and/or other principle colors. Palette entry component 108 may be configured to determine color distributions about the individual principle colors in the set of principle colors. By way of non-limiting example, responsive to identifying the first principle color and/or other principle colors of the first image, palette entry component 108 may be configured to determine a first color distribution about the first principle color and/or other color distributions about other colors. The first color distribution may include a first set of colors that vary with respect to the first principle color. The first set of colors may comprise a homogeneous range of colors. By way of non-limiting example, responsive to identifying the second principle color and/or other principle colors of the first image, palette entry component 108 may be configured to determine a second color distribution about the second principle color and/or other color distributions about other colors. The second color distribution may include a second set of colors that vary with respect to the second principle color. The second set of colors may comprise a homogeneous range of colors.

In some implementations, pixel group component 110 may be configured to determine pixel groups by associating individual pixels with one or more of the pixel groups. Individual pixel groups may correspond to individual color distributions. In some implementations, an individual pixel may be associated with an individual pixel group. In some implementations, individual pixels may be associated with more than one pixel group. Individual pixels may be associated with one or more pixel groups based on correspondences between individual colors of the individual pixels and individual colors included in the individual color distributions of the pixel groups.

Pixel group component 110 may be configured to associate individual pixels with one or more pixel groups by determining correspondences between the individual colors of the individual pixels and the individual colors included in the individual color distributions of the individual pixel groups. In some implementations, a correspondence between an individual pixel color and one or more color distributions may utilize a representation score determined for individual pixels color and individual color distributions. By way of non-limiting illustration, given that a pixel color may be well represented (e.g., representation score above a threshold) by a single color distribution, then a correspondence between the pixel color and a color included in the color distribution may be determined.

In some implementations, a correspondence may be determined by comparing individual colors included in the range of colors of individual color distributions and individual pixel colors. In some implementations a correspondence may be determined based on one or more of an exact match between colors, a "match" within a threshold limit, and/or other considerations. In some implementations, comparisons may include comparing individual values of individual color attributes of individual colors (e.g., values of individual ones of red, green, and blue color attributes in an RGB space). In some implementations, correspondences may be determined by Euclidean distance determined between colors in a color space. In some implementations, a match and/or substantial match may be determined based on a Euclidean distance between compared colors being equal to and/or less than a threshold distance.

By way of non-limiting illustration, individual pixels groups may include one or more of a first pixel group, a second pixel group, and/or other pixel groups. The first pixel group may correspond to the first color distribution, and/or other distributions. A first pixel may be associated with the first pixel group and/or other pixel groups. The association of the first pixel with the first pixel group may be based on a correspondence between a first color of the first pixel and a second color and/or other color within the first set of colors included in the first color distribution. For example, the first color may match the second color. In some implementations, the second pixel group may correspond to the second color distribution. A second pixel may be associated with the second pixel group based on a correspondence between a third color of the second pixel and a fourth color within the second set of colors included in the second color distribution.

In some implementations, associations of individual pixel with multiple pixel groups may be determined based on correspondences of color components of individual colors of individual pixels with one or more color distributions of the pixel groups. Color components may be determined color unmixing component 112. For example, color components of an individual pixel color may comprise different colors selected from a combination of palette entries.

In some implementations, color unmixing component 112 may be configured to determine color components of individual pixel colors. By way of non-limiting example, individual pixel colors may be decomposed into color components, a technique referred to as "color unmixing." Color unmixing may comprise a technique which assumes that a pixel's color may comprise a mixture of multiple color components that may be drawn from distinct color distributions. In particular, given that color distributions may be determined for individual palette entries (e.g., via palette selection component 108), a color unmixing technique employed herein may be configured to determine color components of an individual pixel color that may include colors individually drawn from individual color distributions of individual ones of the palette entries determined by palette entry component 108. Individual color components in a set of color components that make up a pixel color may further include a transparency value, or "alpha value," of the color component, and/or other information. The transparency value may convey a weight of how much a given color component may contribute to an individual pixel's color (e.g., it's intensity, and/or other measure). That is, mixing individual color components having individual transparency values may generate the individual pixel's color.

In some implementations, a color unmixing technique may define one or more constraints which together may ensure that the sum of the color components weighted by the transparency values may add up to the original pixel's color. In some implementations, one or more constraints may be expressed as:

$$\Sigma_i \alpha_i = 1,$$

$$\Sigma_i \alpha_i u_i = c,$$

$$\alpha_i, u_i \in [0,1],$$

wherein $u_i$ represents an individual color component, c represents the pixel color, and $\alpha_i$ represents individual transparency values of individual color components.

In some implementations, given these and/or other constraints, a color unmixing technique may minimizes a cost, $\mathcal{F}$, of selecting a particular mixture of colors. This cost may be expressed as:

$$\mathcal{F} = \Sigma_i \alpha_i \mathcal{D}_i^2(u_i) s.t. i \in \Omega_p,$$

where $\mathcal{D}_i$ represents the Mahalanobis distance that may be employed as a measure of the color component $u_i$'s goodness of fit to a color distribution indexed by i, and $\Omega_p$ defines a subset of color distributions that may be associated with a color of a given pixel, p. In some implementations, the color distributions determined by palette entry component 108 may be serve as a basis for $\Omega_p$. Minimizing the cost simultaneously solves for the color components, $u_i$, and transparency values $\alpha_i$. For a single image pixel with a certain pixel color, the above equation may facilitate estimating a set of palette colors, and determining how to (linearly) combine the palette colors in order to obtain the observed pixel color.

In some implementations, determining a subset of color distributions, $\Omega_p$, for a given pixel, p, may take into account one or more of image regions that may be textured or non-textured, whether a given pixel's color may already corresponded to a single color within a palette entry, and/or other information.

In some implementations, determining a subset of color distributions, $\Omega_p$, for a color of given pixel, p, may comprise an operation of identifying one or more image regions that may be both not textured and may be well represented by a single palette color, and/or other operations. In some implementations, identifying one or more image regions that may be both not textured and may be well represented by a single palette color may be expressed as:

$$\max_k \{e^{-wD_k(c)} e^{-\|\nabla I_p\|}\} < \tau,$$

where $\mathcal{D}_k$ represents the Mahalanobis distance of the pixel color c, k enumerates the whole set of palette entries, and w and r represent model parameters. In some implementations, w=100 and/or other values. In some implementations, τ=0.9, and/or other values. In some implementations, pixels that may fall within the identified one or more image regions may be assigned a subset of color distributions that may include a best fitting palette entry, k. In other words, identifying image regions that may be well represented by a single palette color may be accomplished by assuming pixels in such regions may correspond to a single palette entry, and have low gradient magnitude (e.g., no texture).

In some implementations, determining a subset of color distributions, $\Omega_p$, for a color of given pixel, p, may comprise an operation of identifying regions that may be well represented by a mixture of two (or more) palette entry colors, and/or other operations. In some implementations, identifying these regions may take into account avoiding textured regions, avoiding regions that may have already been assigned to a single palette entry for $\Omega_p$, and/or other information. Non-textured regions may be similarly identified using the above rule, $e^{-\|\nabla I_p\|} < \tau$. By this rule, a gradient magnitude below threshold $\tau$ may be assumed to indicate non-textured regions. In some implementations, identifying, for individual pixels that fall in the above identified region(s), one or more palette entries, such as a pair of palette entries $\{k,l\}$ where $k,l \in \{1 \ldots K\}$ and $k \neq l$, such that the combination of a certain color pair $\{(u_k, u_l)\}$ drawn from the corresponding color distributions weighted by transparency values $\{\alpha_k, \alpha_l\}$ may have the highest representation score.

In some implementations, determining a subset of color distributions, $\Omega_p$, for a color of given pixel, p, may comprise an operation of determining color distributions, $\Omega_p$, for textured regions of an image, and/or other operations. For pixels that may fall within textured regions of an image, determining a subset of color distributions, $\Omega_p$, may comprise an operation of identifying, for individual pixels in such regions, individual closest pixels (e.g., in terms of geodesic distance) already having individually determined subsets of color distribution, $\Omega_p$, and copy these assigned subsets of color distributions to the individual pixels in the textured region. A further operation may comprise determining one or more other palette entries (e.g., color distributions of the palette entries) to add to the copied subsets of color distributions. In some implementations, determining one or more other palette entries may make use of projected color unmixing to approximate a color unmixing costs, described herein, and/or other techniques. A further operation may comprise dilating assigned subsets of color distribution using an m×n kernel to prevent discontinuities at color transitions. By way of non-limiting example, the kernel may be 5×5.

By way of non-limiting illustration, color unmixing component 112 may be configured to determine color components of individual colors of one or more pixels of a first image. Individual color components may include individual colors selected from one or more of the individual color distributions determined by palette entry component 109. By way of non-limiting example, consider again the first pixel group corresponding to the first color distribution, the second pixel group corresponding to the second color distribution, an association of the first pixel with the first pixel group based on a correspondence between the first color of the first pixel and the second color included in the first color distribution, and an association of the second pixel with the second pixel group based on the correspondence between the third color of the second pixel and the fourth color included in the second color distribution. The color unmixing component 112 may be configured to determine a first set of color components of a fifth color of a third pixel, and/or other color components of other pixels. The first set of color components may comprise a sixth color, a seventh color, and/or other colors. The sixth color may be selected from the first color distribution and/or other color distributions. The seventh color may be selected from the second color distribution and/or other color distribution. Accordingly, pixel group component 110 may be configured to associate the third pixel with the first pixel group by virtue of the first set of color components comprising the sixth color (e.g., drawn from the first color distribution), and with the second pixel group by virtue of the first set of color components comprising the seventh color (e.g., drawing from the second color distribution).

Previously discussed was a color unmixing technique that minimizes a cost, F, of selecting a particular mixture of colors, which simultaneously solves for the color components, $u_i$, and transparency values $\alpha_i$. These operations may be computationally expensive. One technique for avoiding at least some of this computational burden may comprise approximating the color components, $u_i$, and transparency values $\alpha_i$ using other information, referred to as "projected color unmixing."

By way of non-limiting illustration, given a pixel's color, and two (or more) palette entries in the form of color distributions, two (or more) planes may be defined as passing through individual ones of the principle (or "mean") colors of the color distributions. For a pair of palate entries, these colors may be denoted as $u_1$ and $u_2$. A normal vector, n, for two planes passing through these principle colors may be defined as the vector from one of the mean colors to the other, denoted as, $n = \mu_1 - \mu_2$. With an assumption that colors from two distributions lie on respective planes, approximated alpha values, $\hat{\alpha}_{\{1,2\}}$, and approximated color components, $\hat{u}_{\{1,2\}}$, may be determined using orthogonal projections of the pixel color, c, onto the planes. Formally, projections of the pixel color onto two planes may be computed as follows:

$$\hat{u}_i = c + \frac{(c - \mu_i) \cdot n}{n \cdot n},$$

where $i \in \{1,2\}$.

Distances, d, in-between projections of the pixel color may be expressed as:

$$d_1 = \|c - \hat{u}_1\|,$$

$$d_2 = \|c - \hat{u}_2\|,$$

$$d_u = \|\hat{u}_1 - \hat{u}_2\|,$$

whereas the alpha values may be estimated using the following rule:

$$\hat{\alpha}_1 = \begin{cases} \frac{d_2}{d_u} & \text{if } d_1, d_2 < d_u \\ 1 & \text{if } d_1 > d_u \\ 0 & \text{if } d_2 > d_u \end{cases}, \text{ and}$$

$$\hat{\alpha}_2 = 1 - \hat{\alpha}_1.$$

If the pixel color does not fall between the two planes, the closer distribution may be assigned the unity alpha value. While these operation may return the alpha and color approximations, using the approximate colors directly to get the individual sample costs may result in artificially high cost values. For a more accurate approximation, since space may be constrained to the corresponding planes, the color distributions may be constrained as well. For this purpose, covariance of the distributions in the normal direction may be neglected, effectively projecting the color distributions onto 2D planes. A further operation may comprise computing individual projected costs $\mathcal{F}$, using these projected 2D normal distributions, represented as:

$$\mathcal{F} = \begin{cases} \hat{\alpha}_1 \mathcal{D}_1^{proj}(\hat{u}_1) + \hat{\alpha}_2 \mathcal{D}_2^{proj}(\hat{u}_2) & \text{if } \hat{\alpha}_1, \hat{\alpha}_2 > 0 \\ \mathcal{D}_1(c) & \text{if } \hat{\alpha}_1 = 1 \\ \mathcal{D}_2(c) & \text{if } \hat{\alpha}_2 = 1 \end{cases}.$$

In some implementations, since the Mahalanobis distance Di( ) measures the distance in terms of the number of variance steps taken in one particular direction regardless of the number of dimensions, the information loss after projection is limited only to a single direction defined by the normal vector.

In contrast to color unmixing technique that may use a costly nonlinear optimization process, the projected color unmixing technique may be performed by computing a small number of linear operations. While the accuracy of this approximation may not be sufficient for producing final pixel group associations, the approximation of color unmixing costs may be successfully utilized for algorithmic steps that require unmixing costs. This way, we may achieve real-time feedback for manual palette construction, an efficient automatic palette generation method, and a feasible, pixel-level subsets of palette entries used for high-quality color fields.

Returning to FIG. 1, interface component 114 may be configured to effectuate presentation of one or more user interfaces via one or more computing platforms 120 associated with user. A user interface may include one or more user interface elements. A user interface element may include one or more of a display element, an input element, and/or other elements. A display element may include a portion or area of a user interface that may present information. By way of non-limiting illustration, a display element of a user interface may present an image, and/or other information. An display element may facilitate user interaction with the displayed information. By way of non-limiting illustration, a display element showing an image may be selectable by a user to select portions, areas, and/or pixels of the image. An input element may be configured to obtain user entry and/or selection of information. An input element may include one or more of a check box, a drop down menu, a text input bar, a selectable virtual button, and/or other user interface elements.

In some implementations, a user interface (e.g., user interface 900 in FIG. 9) may be configured to facilitate one or more features and/or functions of system 100 and/or provide visualization of one or more aspects of system 100. By way of non-limiting illustration, a user interface may be configured to facilitate one or more features and/or functions of system 100 and/or provide visualization of one or more of palette entry determination by palette entry component 108, palette coverage determination by palette entry component 108, and/or other aspects of system 100.

Figure 9:
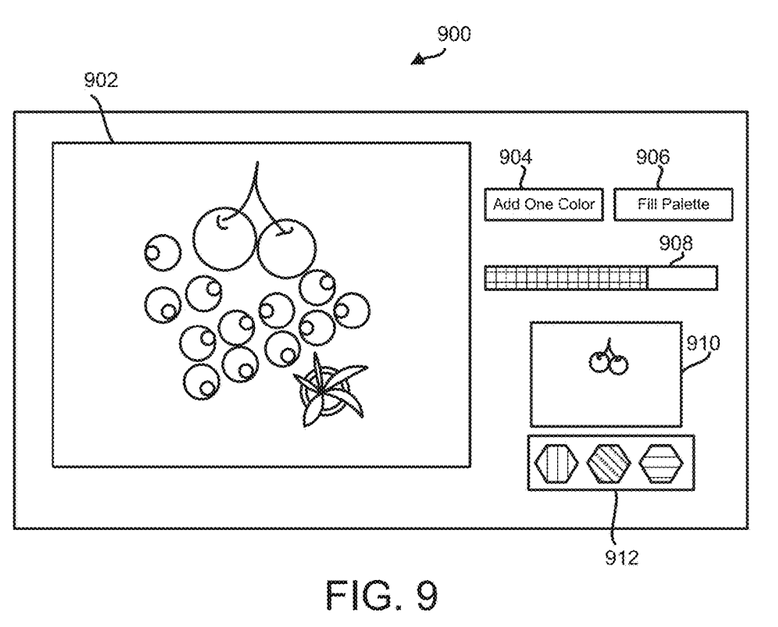
FIG. 9 illustrates an exemplary user interface in accordance with one or more implementations of system of FIG. 1.

By way of non-limiting illustration in FIG. 9, user interface 900 is shown. User interface 900 may be configured to facilitate one or more features and/or functions of system 100 and/or provide visualization of one or more features and/or functions of system 100 of FIG. 1. User interface 900 may be configured for presentation on a display of a computing platform. User interface 900 may include one or more user interface elements. The one or more user interface elements may include one or more of a first user interface element 902, a second user interface element 904, a third user interface element 906, a fourth user interface element 908, a fifth user interface element 910, a sixth user interface element 912, and/or other user interface elements.

In some implementations, first user interface element 902 may comprise a display element configured to display an image, and/or other information. In some implementations, first user interface element 902 may facilitate user interaction with a displayed image. By way of non-limiting illustration, a user may select (e.g., via a cursor and/or other input) a color shown on the image. The user selection may facilitate an identification of a principle color, as described herein.

In some implementations, second user interface element 904 may be selectable by a user to facilitate automatically identifying principle colors (e.g., one at a time), as presented herein. In some implementations, third user interface element 906 may be configured to facilitate automatically identifying a set of principle colors that may be used to generate corresponding color distributions for palette entries that may represent an image in its entirety and/or based on a palette coverage above a threshold, as presented herein.

In some implementations, fourth user interface element 908 may comprise a display element showing a progress bar and/or other visualization associated with palette coverage determination by palette entry component 108. This may guide a user into selecting one or more principle colors via user input and/or selecting second user interface element 904 to automatically add another palette entry via automatic selection of another principle color.

In some implementations, fifth user interface element 910 may comprise a display element configured to provide a visualization of a current coverage of image colors based on a current set of palette entries of a palette (e.g., visualized in sixth user interface element 912). For example, the visualization provided in fifth user interface element 910 may show parts or regions of an image faded away in response to the colors of those parts being represented by at least one palette entry in a current palette.

In some implementations, sixth user interface element 912 may comprise a display element configured to visualize one or more palette entries of a current palette. As describe above, additional palette entries may be added based on user selection of colors on an image display via first user interface element 902, and/or automatic selection via second and/or third user interface elements 904, 906. Individual palette entries and/or color distributions of the palette entries may be visualized as a distribution about a hexagon. In a color space, a distribution may be a point cloud. By way of non-limiting illustration, a hexagon's center may comprise a principle color, and each vertex may represent the principle color "shifted" in the direction of an eigenvector. A variance along eigenvectors in positive and negative directions may define colors of the six vertices. The colors of the vertices may be used for linearly interpolating colors that fill the hexagon. The colors that fill the hexagon may comprise the color distribution about the principle color.

Returning to FIG. 1, editing component 116 may be configured to facilitate editing of images, and/or other operations. In some implementations, editing may comprise color editing. In some implementations, the color editing may comprise palette-based color editing, in accordance with one or more implementations of system 100 herein. By way of non-limiting example, color editing may include modify individual colors (and/or color components) of individual pixels of an image based on associations of individual pixels with one or more pixel groups. Individual colors (and/or color components) of individual pixels of individual pixel groups may be modified separately from other individual colors (and/or color components) of individual pixels of other individual pixel groups.

In some implementations, editing individual colors and/or color components of individual pixel colors may be based on shifting the individual colors and/or color components within a color space. In some implementations, the shift may comprise a linear shift of individual colors and/or color components associated within individual ones of the pixel groups. A visualization of this process is shown in FIG. 2-FIG. 8, By way of non-limiting illustration in FIG. 3, an exemplary image 200 is shown. It is noted that the image 200 is an arbitrarily image and it not to be considered limiting with respect to the colors included in the image 200 and/or other features of the image 200. FIG. 3 shows an exemplary RGB space plot 300 of the pixels of image 200 of FIG. 2. In the plot 300, individual points may represent individual colors of individual pixels.

Figure 2:
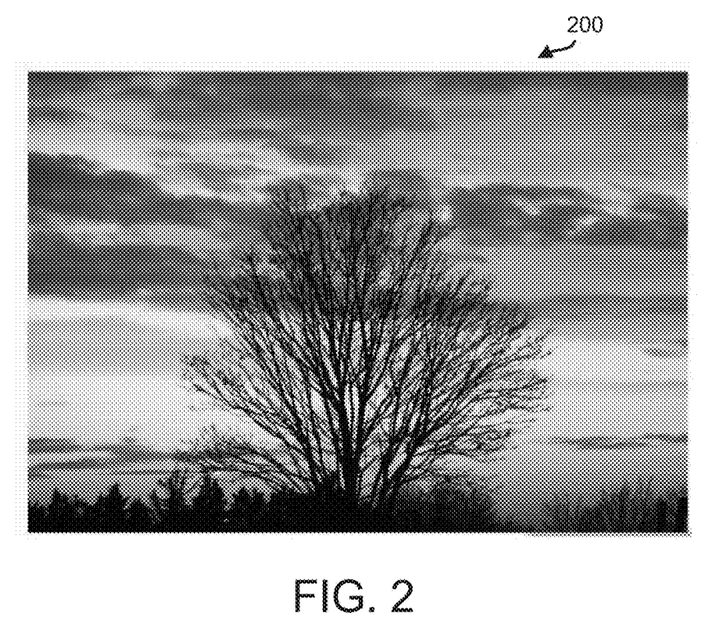
FIG. 2 illustrates an exemplary image used for palette-based color editing in accordance with one or more implementations.
Figure 3:
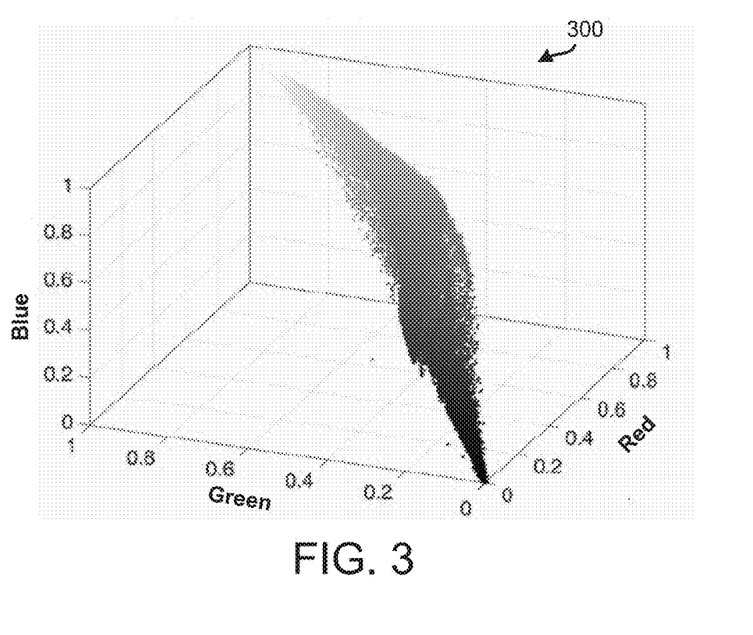
FIG. 3 illustrates a plot of pixel colors of the image of FIG. 2 in an RGB color space.
Figure 4:
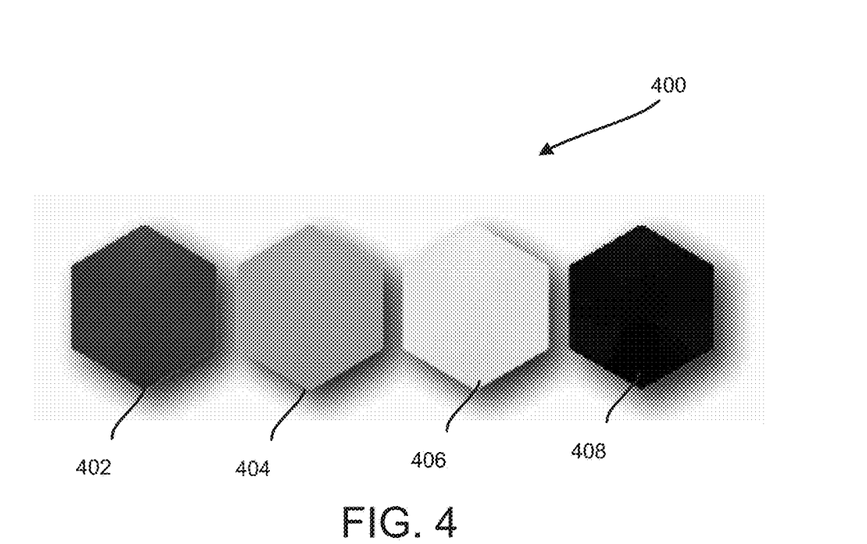
FIG. 4 illustrates an exemplary color palette of the image of FIG. 2, determined in accordance with one or more implementations of system of FIG. 1.

FIG. 4 shows an illustrates a color palette 400 of image 200 of FIG. 2, determined in accordance with one or more implementations of system 100 of FIG. 1 presented herein. The color palette 400 may include one or more palette entries. For illustrative purposes, color palette 400 may include a first palette entry 402, a second palette entry 404, a third palette entry 406, and a fourth palette entry. Individual ones of the palette entries may correspond to color distributions that are visualized in the hexagonal shapes shown. Based on the color palette 400, individual pixels may be associated with individual pixel groups that correspond to individual ones of the color distributions. As presented herein, individual pixels may be associated with one or more pixel groups based on correspondences between pixel colors and colors included in the color distributions, and/or between color components of pixel colors and the colors included in the color distributions.

Figure 5:
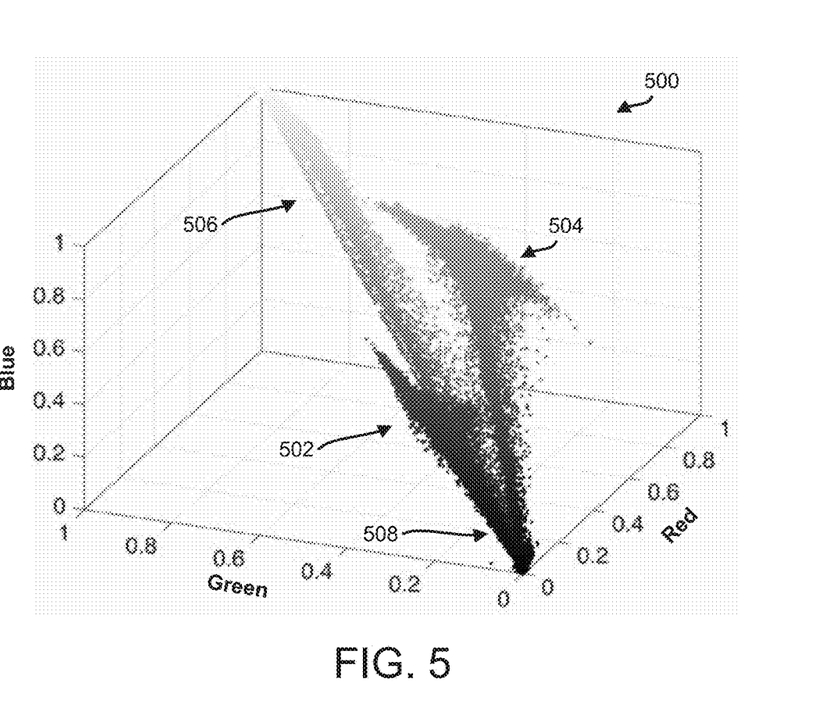
FIG. 5 illustrates a plot of pixel colors of the image of FIG. 2 reflecting four pixel groups determined based on the color palette of FIG. 4.

FIG. 5 illustrates a RGB plot 500 showing plots of pixel colors of image 200 based on associations of individual pixel colors and/or color components with individual pixel groups. For example, the pixel groups may include one or more of a first pixel group 502 corresponding to the first palette entry 402, a second pixel group 504 corresponding to the second palette entry 404, a third pixel group 506 corresponding to the third palette entry 406, and a fourth pixel group 508 corresponding to the fourth palette entry 408. Individual points in plot 500 may represent either an individual color of an individual pixels or an individual color component of an individual pixel.

Figure 6:
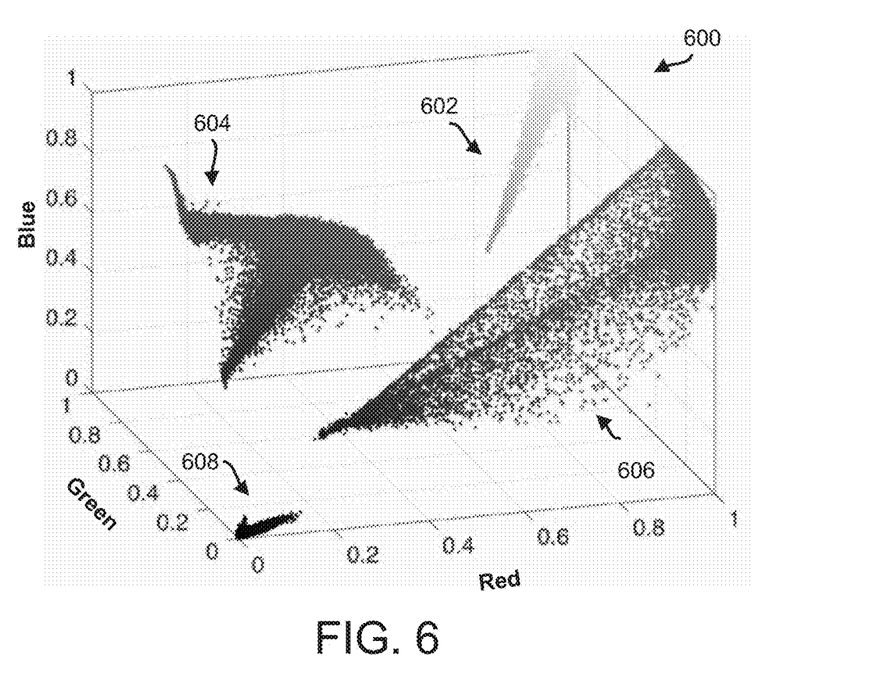
FIG. 6 illustrates a plot of pixel colors showing a shift of individual pixel groups in accordance with one or more editing techniques presented herein.
Figure 7:
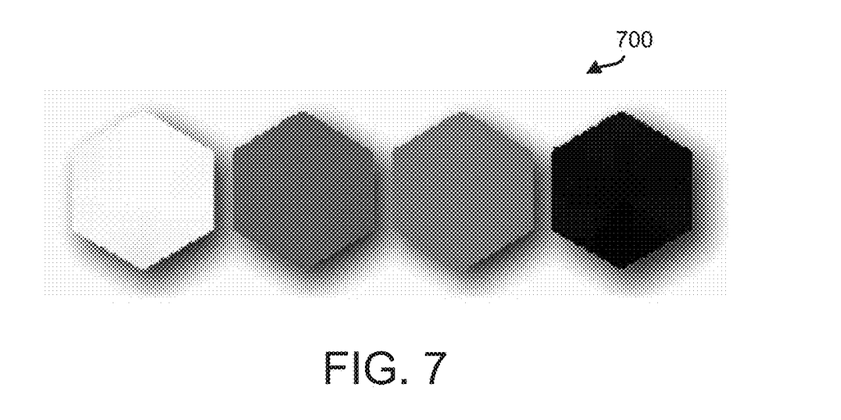
FIG. 7 shows an exemplary color palette representative of the shifted pixel groups in FIG. 6.

In some implementations, individual colors and/or color components of individual pixel colors in a given pixel group may be edited independent from other pixel groups by shifting (e.g. linearly shifting) the points shown in plot 500 in FIG. 5. FIG. 6 shows an exemplary RGB plot 600 of pixel groups conveying color edits. The pixel groups may include one or more of a fifth pixel group 602 corresponding to a shift of the first pixel group 502 in FIG. 5, a sixth pixel group 604 corresponding to a shift of the second pixel group 504 in FIG. 5, a seventh pixel group 606 corresponding to a shift of the third pixel group 506 in FIG. 5, and/or an eighth pixel group 608 corresponding to a shift of the fourth pixel group 508 in FIG. 5. FIG. 7 shows a result of the color edits in an edited color palette 700.

Figure 8:
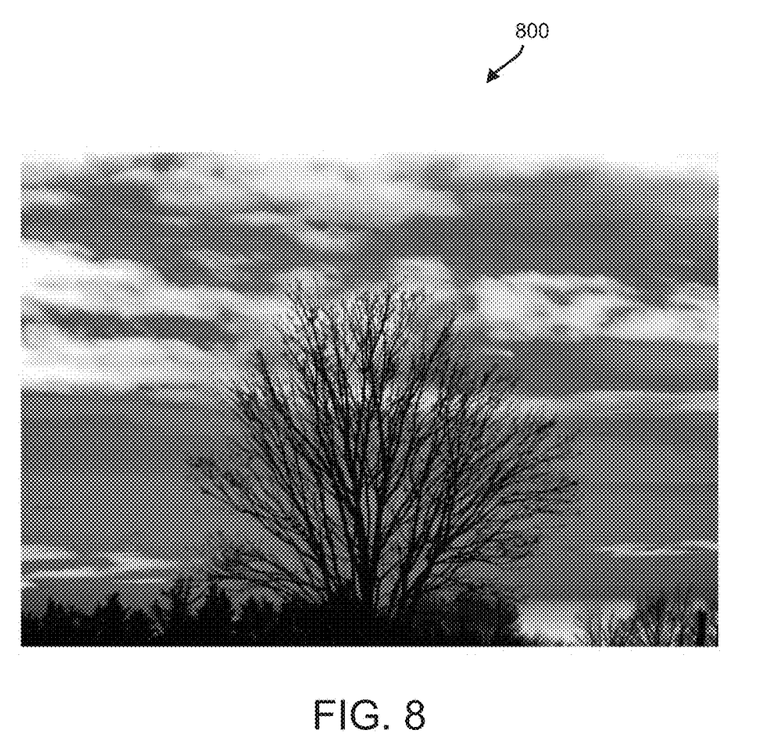
FIG. 8 shows an exemplary color edited image.

FIG. 8 illustrates a resultant edited image 800. Editing image 800 may be generated based on plot 600 and generating pixel colors either directly from colors specified by points on plot 600 and/or by combining colors specified by points that represented color components of individual pixel colors using associating transparency values.

Returning to FIG. 1, server 102, computing platform(s) 120, and/or external resources 124 may be operatively linked via one or more electronic communication links. For example, such electronic communication links may be established, at least in part, via network(s) 122 such as the Internet and/or other networks. It will be appreciated that this is not intended to be limiting and that the scope of this disclosure includes implementations in which server 102, computing platform(s) 120, and/or external resources 124 may be operatively linked via some other communication media.

The external resources 124 may include sources of information (e.g., visual information defining images), hosts, external entities participating with system 100, and/or other resources. In some implementations, some or all of the functionality attributed herein to external resources 124 may be provided by resources included in system 100.

The server 102 may include electronic storage 118, one or more processors 104, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 104, information received from computing platform(s) 120, and/or other information that enables server 102 to function as described herein.

Processor(s) 104 may be configured to provide information-processing capabilities in server 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, 112, 114, and/or 116. Processor(s) 104 may be configured to execute components 108, 110, 112, 114, and/or 116 by software; hardware; firmware; some combination of software, hardware, and/or firmware; and/or other mechanisms for configuring processing capabilities on processor(s) 104.

It should be appreciated that although components 108, 110, 112, 114, and/or 116 are illustrated in FIG. 1 as being co-located within a single processing unit, in implementations in which processor(s) 104 includes multiple processing units, one or more of components 108, 110, 112, 114, and/or 116 may be located remotely from the other components. The description of the functionality provided by the different components 108, 110, 112, 114, and/or 116 described above is for illustrative purposes and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, 116, and/or other components. As another example, processor(s) 104 may be configured to execute one or more additional components that may perform some or all of the functionality attributed below to one of components 108, 110, 112, 114, and/or 116.

Figure 10:
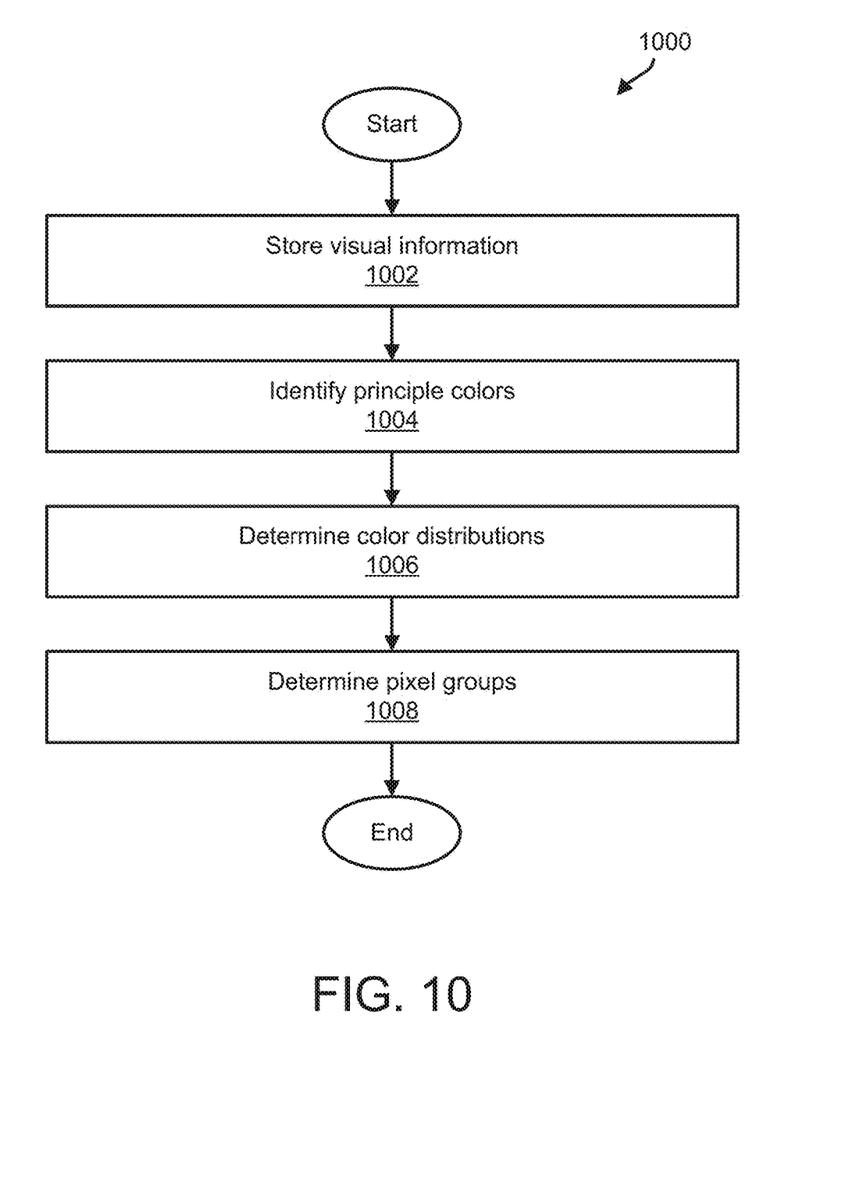
FIG. 10 illustrates a method of facilitating palette-based color editing, in accordance with one or more implementations.

FIG. 10 illustrates a method 1000 of facilitating palette-based color editing. The operations of method 1000 presented below are intended to be illustrative. In some embodiments, method 1000 may be accomplished with one or more additional operations not described, and/or without one or more of the operations discussed. Additionally, the order in which the operations of method 1000 are illustrated in FIG. 2 and described below is not intended to be limiting.

In some embodiments, method 1000 may be implemented in a computer system comprising one or more processing devices (e.g., physical processor, a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 1000 in response to instructions stored electronically on electronic storage media. The one or more processing devices may include one or more devices configured through hardware, firmware, and/or software to be specifically designed for execution of one or more of the operations of method 1000.

At an operation 1002, visual information of a first image and/or other images may be stored. The visual information may be individual colors of individual pixels of the first image and/or other images. In some implementations, operation 1002 may be performed by non-transitory electronic storage the same as or similar to non-transitory electronic storage 118 (shown in FIG. 1 and described herein).

At an operation 1004, a set of principle colors from among the individual colors of the individual pixels of the first image and/or other images may be identified. In some implementations, operation 1004 may be performed by one or more physical processors executing a palette entry component the same as or similar to palette entry component 108 (shown in FIG. 1 and described herein).

At an operation 1006, color distributions about individual principle colors may be determined. An individual color distribution may include colors that vary with respect to an individual principle color. By way of non-limiting illustration, responsive to identifying a first principle color of the first image, a first color distribution about the first principle color may be determined. The first color distribution may include a first set of colors that vary with respect to the first principle color. By way of non-limiting illustration, responsive to identifying a second principle color of the first image, a second color distribution about the second principle color may be determined. The second color distribution may include a second set of colors that vary with respect to the second principle color. In some implementations, operation 1006 may be performed by one or more physical processors executing a palette entry component the same as or similar to palette entry component 108 (shown in FIG. 1 and described herein).

At an operation 1008, pixel groups may be determined. Pixel groups may be determined by associating individual pixels with one or more of the pixel groups. Individual pixel groups may correspond to individual color distributions. Individual pixels may be associated with one or more of the individual pixel groups based on correspondences between individual colors of the individual pixels and individual colors included in the individual color distributions corresponding to the individual pixel groups, and/or other information. By way of non-limiting illustration, pixel groups may include one or more of a first pixel group, a second pixel group, and/or other pixel groups. The first pixel group may to the first color distribution. A first pixel may be associated with the first pixel group based on a correspondence between a first color of the first pixel and a second color and/or other colors within the first set of colors included in the first color distribution and/or other color distributions. The second pixel group may correspond to the second color distribution. A second pixel may be associated with the second pixel group based on a correspondence between a third color of the second pixel and a fourth color and/or other colors within the second set of colors included in the second color distribution, and/or other color distributions. In some implementations, operation 1008 may be performed by one or more physical processors executing a pixel group component the same as or similar to pixel group component 108 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate palette-based color editing of images, the system comprising:
  non-transitory electronic storage storing visual information of a first image, the visual information defining individual colors of individual pixels of the first image; and
  one or more physical processors configured by machine-readable instructions to:
    identify a set of principle colors from among the individual colors of the individual pixels of the first image, wherein individual principle colors are identified based on sizes of individual regions of the first image that share individual colors, such that individual principle colors are identified as the individual colors of the individual regions of the first image that are relatively larger than other ones of the individual regions;
    determine color distributions about the individual principle colors, an individual color distribution including colors that vary with respect to an individual principle color, such that:
      responsive to identifying a first principle color of the first image, a first color distribution about the first principle color is determined, the first color distribution including a first set of colors that vary with respect to the first principle color; and responsive to identifying a second principle color of the first image, a second color distribution about the second principle color is determined, the second color distribution including a second set of colors that vary with respect to the second principle color;

determine pixel groups by associating individual pixels with one or more of the pixel groups, individual pixel groups corresponding to individual color distributions, wherein individual pixels are associated with one or more of the individual pixel groups based on correspondences between individual colors of the individual pixels and individual colors included in the individual color distributions corresponding to the individual pixel groups, the pixel groups including:

a first pixel group corresponding to the first color distribution, a first pixel being associated with the first pixel group based on a correspondence between a first color of the first pixel and a second color within the first set of colors included in the first color distribution; and a second pixel group corresponding to the second color distribution, a second pixel being associated with the second pixel group based on a correspondence between a third color of the second pixel and a fourth color within the second set of colors included in the second color distribution; and modify the individual colors of individual pixels of the first image based on the associations of the individual pixels with the individual pixel groups, wherein the individual colors of the individual pixels of the individual color groups are modified separately from other individual colors of the individual pixels of other individual color groups.

2. The system of claim 1, wherein the associations with pixel groups are further determined based on correspondences of color components of the individual colors of the individual pixels with one or more of the color distributions.

3. The system of claim 2, wherein the one or more physical processors are further configured by machine-readable instructions to:

determine color components of individual colors of one or more pixels of the first image, individual color components comprising individual colors selected from one or more of the color distributions, such that a first set of color components of a fifth color of a third pixel is determined, the first set of color components comprising a sixth color selected from the first color distribution and a seventh color selected from the second color distribution; and determine the correspondences between individual colors of the individual pixels and individual colors included in the individual color distributions based on the selections of colors for the color components of the individual colors of the individual pixels, such that responsive to determining the first set of color components, the third pixel is associated with the first pixel group by virtue of the first set of color components comprising the sixth color, and the second pixel group by virtue of the first set of color components comprising the seventh color.

4. The system of claim 1, wherein individual principle colors are further identified based on user input.

5. The system of claim 1, wherein the colors included in the individual color distributions are homogeneous ranges of colors.

6. The system of claim 1, wherein the correspondences are determined based on representation scores determined between the individual colors of the individual pixels and the individual color distributions, wherein individual representation scores represent how well the individual color distributions represents the individual colors of the individual pixels, and wherein individual correspondences are determined based on the individual representation scores exceeding a threshold score.

7. The system of claim 1, wherein the one or more physical processors are further configured by machine-readable instructions to:

determine a ratio of a quantity of pixels having colors that correspond to individual colors included in the individual color distributions to a total quantity of image pixels.

8. The system of claim 1, wherein individual color distributions are exclusive.

9. A method to facilitate palette-based color editing of images, the method being implemented in a computer system comprising one or more physical processors and storage media storing machine-readable instructions, the method comprising:

storing visual information of a first image, the visual information defining individual colors of individual pixels of the first image;

identifying a set of principle colors from among the individual colors of the individual pixels of the first image, wherein individual principle colors are identified based on sizes of individual regions of the first image that share individual colors, such that individual principle colors are identified as the individual colors of the individual regions of the first image that are relatively larger than other ones of the individual regions;

determining color distributions about the individual principle colors, an individual color distribution including colors that vary with respect to an individual principle color, including:

responsive to identifying a first principle color of the first image, determining a first color distribution about the first principle color, the first color distribution including a first set of colors that vary with respect to the first principle color; and responsive to identifying a second principle color of the first image, determining a second color distribution about the second principle color, the second color distribution including a second set of colors that vary with respect to the second principle color;

determining pixel groups by associating individual pixels with one or more of the pixel groups, individual pixel groups corresponding to individual color distributions, wherein individual pixels are associated with one or more of the individual pixel groups based on correspondences between individual colors of the individual pixels and individual colors included in the individual color distributions corresponding to the individual pixel groups, the pixel groups including:

a first pixel group corresponding to the first color distribution, a first pixel being associated with the first pixel group based on a correspondence between a first color of the first pixel and a second color within the first set of colors included in the first color distribution; and a second pixel group corresponding to the second color distribution, a second pixel being associated with the second pixel group based on a correspondence between a third color of the second pixel and a fourth color within the second set of colors included in the second color distribution; and modifying the individual colors of individual pixels of the first image based on the associations of the individual pixels with the individual pixel groups, wherein the individual colors of the individual pixels of the individual color groups are modified separately from other individual colors of the individual pixels of other individual color groups.

10. The method of claim 9, wherein the associations with pixel groups are further determined based on correspondences of color components of the individual colors of the individual pixels with one or more of the color distributions.

11. The method of claim 10, further comprising:
determining color components of individual colors of one or more pixels of the first image, individual color components comprising individual colors selected from one or more of the color distributions, including determining a first set of color components of a fifth color of a third pixel, the first set of color components comprising a sixth color selected from the first color distribution and a seventh color selected from the second color distribution; and determining the correspondences between individual colors of the individual pixels and individual colors included in the individual color distributions based on the selections of colors for the color components of the individual colors of the individual pixels, such that responsive to determining the first set of color components, the third pixel is associated with the first pixel group by virtue of the first set of color components comprising the sixth color, and the second pixel group by virtue of the first set of color components comprising the seventh color.

12. The method of claim 9, wherein individual principle colors are further identified based on user input.

13. The method of claim 9, wherein the colors included in the individual color distributions are homogeneous ranges of colors.

14. The method of claim 9, wherein the correspondences are determined based on representation scores determined between the individual colors of the individual pixels and the individual color distributions, wherein individual representation scores represent how well the individual color distributions represents the individual colors of the individual pixels, and wherein individual correspondences are determined based on the individual representation scores exceeding a threshold score.

15. The method of claim 9, further comprising:
determining a ratio of a quantity of pixels having colors that correspond to individual colors included in the individual color distributions to a total quantity of image pixels.

16. The method of claim 9, wherein individual color distributions are exclusive.

* * * * *